(12) United States Patent
Suzuki

(10) Patent No.: US 6,775,214 B2
(45) Date of Patent: Aug. 10, 2004

(54) DATA RECORDING IRRADIATION POWER CONTROL METHOD AND DISK DRIVE

(75) Inventor: Michio Suzuki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 517 days.

(21) Appl. No.: 09/955,584

(22) Filed: Sep. 19, 2001

(65) Prior Publication Data

US 2003/0021199 A1 Jan. 30, 2003

(30) Foreign Application Priority Data

Jul. 24, 2001 (JP) ........................................ 2001-223396

(51) Int. Cl.$^7$ ................................................ G11B 7/00
(52) U.S. Cl. ................................ 369/47.51; 369/47.53; 369/47.33; 369/53.26
(58) Field of Search ............................. 369/47.5, 47.51, 369/47.52, 47.53, 47.32, 47.33, 47.34, 53.12, 53.13, 53.18, 53.26, 53.27, 53.29, 53.31, 53.36, 116

(56) References Cited

U.S. PATENT DOCUMENTS 5,274,622 A * 12/1993 Kono .......................... 369/116
5,289,440 A * 2/1994 Bakx ........................ 369/53.37
6,636,468 B2 * 10/2003 Salmonsen et al. ....... 369/47.53
6,665,243 B2 * 12/2003 Kelly et al. ................. 369/47.5

FOREIGN PATENT DOCUMENTS

JP        2000090465 A   *  3/2000

* cited by examiner

*Primary Examiner*—Thang V. Tran
(74) *Attorney, Agent, or Firm*—Pillsbury Winthrop LLP

(57) ABSTRACT

This invention comprises additional recording means for recording the data in a predetermined position on an optical disk, then reproducing the data recorded in the predetermined position, and not only detecting the end of the predetermined position but also recording the data again from an unrecorded area following the end and power control means for controlling the recording power in recording the recording data, on the basis of the result of the reproduction in the additional recording.

20 Claims, 3 Drawing Sheets

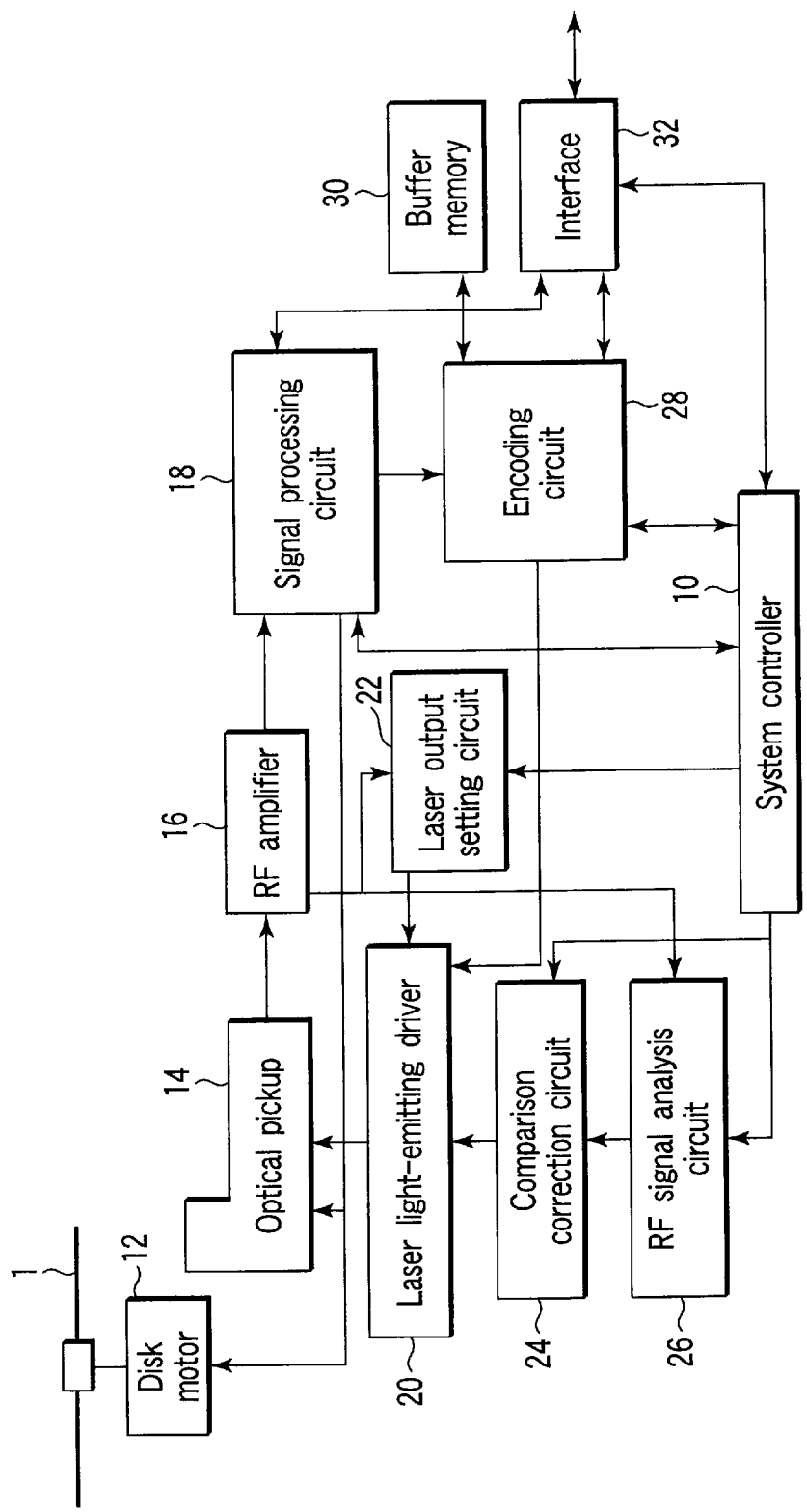
F I G. 1

DATA RECORDING IRRADIATION POWER CONTROL METHOD AND DISK DRIVE

CROSS-REFERENCE TO RELATED APPLICATIONS

This invention is based upon and claims the benefit of priority from the prior Japanese Patent Application No. 2001-223396, filed Jul. 24, 2001, the entire contents of which are incorporated herein by reference.

BACKGROUND OF THE INVENTION

1. Field of the Invention

This invention relates to a disk drive for recording data onto a disk and reproducing the data recorded on a disk. Furthermore, this invention relates to a data recording irradiation power control method of controlling the irradiation power of a light beam for recording data onto a disk.

2. Description of the Related Art

To record data onto an optical disk suitably, it is necessary to adjust the irradiation power of the recording light beam. For instance, there is a method of recording data in a predetermined recording area on an optical disk with a recording light beam of a predetermined irradiation power and adjusting the irradiation power on the basis of the result of the reproduction of the data. In addition, there is another method of monitoring the reflected light from the optical disk in the course of recording the data and adjusting the irradiation power.

For instance, when the rotation of the optical disk is controlled using CAV (Constant Angle Velocity), the irradiation power adjusting method might not produce the best irradiation power. In CAV control, the linear velocity varies according to the radial position on the optical disk. Therefore, when the radial position where the irradiation power has been adjusted differs from the radial position in which the data is actually recorded, the data might not be recorded suitably with the adjusted irradiation power. Moreover, the irradiation power adjusting method might not produce the best irradiation power when a warp in the optical disk is large. When the irradiation power is increased because of such a cause as a large warp in the optical disk, the symmetry of the waveform of the reproduced signal of the recorded data is liable to become worse.

BRIEF SUMMARY OF THE INVENTION

The object of the present invention is to solve the above problem. Specifically, the object of the present invention is to provide an optical disk drive and a data irradiation power control method which are capable of adjusting the data recording irradiation power suitably.

To solve the above problem and achieve the object, the disk drive and data recording irradiation power control method are constructed as follows:

(1) A disk drive comprising: recording means for irradiating onto a disk a light beam of recording power outputted corresponding to recording data and thereby recording the recording data onto the disk; reproducing means for irradiating onto the disk a light beam of reproducing power, detecting the reflected light of the light beam, and reproducing the recording data reflected in the reflected light; additional recording means for causing the recording means to record the data in a predetermined position on the disk, then causing the reproducing means to reproduce the data recorded in the predetermined position, and thereafter not only detecting the end of the predetermined position but also causing the recording means to record the data again from an unrecorded area following the end; and power control means for controlling the recording power when the recording means records the recording data on the basis of the result of the reproduction in additional recording by the additional recording means.

(2) A data recording irradiation power control method comprising the steps of: irradiating onto a disk a light beam of recording power outputted corresponding to recording data and thereby recording the recording data onto the disk; irradiating a light beam of reproducing power at a predetermined position on the disk after the data has been recorded in the predetermined position on the disk in the recording step, detecting the reflected light from the predetermined position, reproducing the recording data reflected in the reflected light, and not only detecting the end of the predetermined position but also additional recording the data again from an unrecorded area following the end; controlling the recording power when the recording data is recorded in the recording step on the basis of the result of the reproduction in additional recording in the additional recording step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing an example of an optical disk unit according to the present invention;

DETAILED DESCRIPTION OF THE INVENTION

Figure 2:
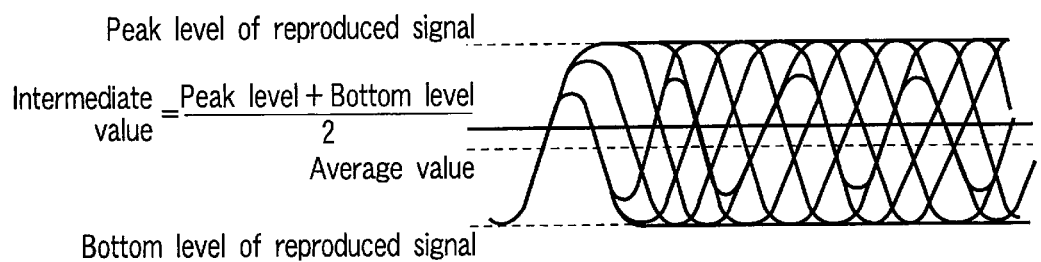
FIG. 2 is a diagram to help explain the average amplitude value of the reproduced signal and the intermediate value between the peak level and bottom level of the reproduced signal.

Hereinafter, referring to the accompanying drawings, an embodiment of the present invention will be explained.

FIG. 1 is a block diagram showing an example of an optical disk unit according to the present invention. The optical disk unit records data onto an optical disk 1 and reproduces the data recorded on the optical disk 1. The optical disk unit includes a system controller 10, a disk motor 12, an optical pickup 14, an RF amplifier 16, a signal processing circuit 18, a laser light-emitting driver 20, a laser output setting circuit 22, a comparison correction circuit 24, an RF signal analysis circuit 26, an encoding circuit 28, a buffer memory 30, and an interface 32.

The system controller 10 controls the individual sections and causes them to record data onto an optical disk or reproduce the data recorded on the optical disk. The disk motor 12 rotates the optical disk. The optical pickup 14 includes a laser diode for irradiating a light beam on the optical disk. The optical laser outputs an optical beam of recording power and an optical beam of reproducing power. The optical pickup 14 includes a photodetector for detecting the reflected light from the optical disk. The photodetector converts the reflected light from the optical disk into an electric signal, or the reproduced signal, and outputs the signal.

The RF amplifier 16 generates an RF signal and servo signal from the reproduced signal. The signal processing circuit 18 decodes the RF signal. The signal processing circuit 18 generates a control signal for controlling the focusing and tracking of the optical pickup from the servo signal. In addition, the signal processing circuit 18 generates a control signal for controlling the rotation of the disk motor from the servo signal.

The laser output setting circuit 22 sets the setting values of the recording power and reproducing power of the light beam supplied from the system controller 10. Furthermore, the laser output setting circuit 22 adjusts the setting value of recording power on the basis of fluctuations in the reflectivity obtained from the RF signal. The laser light-emitting driver 20 causes the laser diode on the optical pickup 14 to emit a light beam of the power according to the setting by the laser output setting circuit 22.

The RF signal analysis circuit 26 detects the symmetry of the reproduced signal. That is, as shown in FIG. 2, the RF signal analysis circuit 26 detects not only the average amplitude value of the reproduced value but also the intermediate value between the peak level and bottom level of the reproduced signal. The comparison correction circuit 24 compares the average amplitude value with the intermediate value and, on the basis of the result of the comparison, supplies a correction signal to the laser light-emitting driver 20. Specifically, the comparison correction circuit 24 compares the average amplitude value with the intermediate value. If the average amplitude value is smaller than the intermediate value, the comparison correction circuit 24 outputs a correction signal that makes the laser light-emitting output lower than the setting value at the laser output setting circuit. Conversely, if the result of the comparison has shown that the average amplitude value is larger than the intermediate value, the comparison correction circuit 24 outputs a correction signal that makes the laser light-emitting output higher than the setting value at the laser output setting circuit.

The encoding circuit 28 encodes the recording data. The buffer memory 30 stores temporarily the data processed or to be processed at the encoding circuit 28. The interface 32 supplies not only the recording data from the outside to the encoding circuit 28 but also the reproduced data decoded at the signal processing circuit 18 to the outside.

When the power supply of the optical disk unit in which an optical disk has been installed is turned on, or when an optical disk is installed in the optical disk unit whose poser supply is on, the system controller 10 adjusts the recording characteristic. That is, the system controller 10 records a test pattern in the calibration area on the optical disk and adjusts the recording power on the basis of the result of reproducing the test pattern. It is assumed that, for example, the calibration area is provided on the inner edge side of the optical disk. The calibration of the recording power using the calibration area is called initial power calibration.

An explanation of the initial power calibration will be given. The system controller 10 causes the encoding circuit 28 to generate a test pattern. The laser light-emitting driver 20 causes the laser diode to emit light according to the test pattern. At this time, the system controller 10 supplies such output values which change the laser power stepwise to the laser output setting circuit 22. As a result, the power of the laser diode changes stepwise. That is, the test pattern is recorded with the stepwise changing laser power. The test pattern is reproduced, thereby determining the recording power. After the recording data is inputted via the interface 32, the recording data is recorded with the recording power determined by the reproduction of the test pattern.

When the rotation of the optical disk is controlled using CAV, the linear velocity varies according to the radial position on the optical disk. That is, the linear velocity at the outer edge of the optical disk is larger than that at the inner edge. The recording power is controlled according to a change in the linear velocity as described below. The recording area of the optical disk is divided radially into sub-areas. In other words, the recording area of the optical disk is divided into a plurality of doughnut-like areas differing in radius. In recording the data, when the place in which the data is recorded has reached the specified area at the division boundary and the data whose writing can be interrupted starts to be recorded (or the condition for the interruption of recording is fulfilled), the recording is interrupted. The data whose writing can be interrupted is such a data part as the synchronizing signal whose recording format will not collapse.

When the unit is jolted, a recording interrupt instruction is externally given. The recording interrupt instruction is inputted via the interface 32. Alternatively, when the recording data runs short, the recording interrupt instruction is given. When the recording interrupt instruction has been given and the condition for the interruption of recording has been met, the recording is interrupted. When the recording interrupt instruction has been externally given, the recording interrupt instruction is checked and then a recording interrupt flag is returned to the outside. After the vibration has stopped and the servo control has become stable, a recording resume instruction is externally given. In addition, after the shortage of the recording data is remedied, the recording resume instruction is given.

The interruption of recording due to a shortage of the recording data and the resumption of recording as a result of remedying the recording data shortage will be explained. The recording data is held in the buffer memory 30 via the interface 32 and encoding circuit 28. The encoding circuit 28 monitors the capacity of the recording data held in the buffer memory 30. When detecting the fact that the capacity of the recording data held in the buffer memory 30 has dropped below a predetermined capacity, the encoding circuit 28 informs the system controller 10 of the buffer underrun. The system controller 10, receiving the information, controls the individual sections to interrupt the recording, when the condition for the interruption of recording has been met. With the recording operation being interrupted, when detecting the fact that the capacity of the recording data held in the buffer memory 30 has been restored to the predetermined capacity or above, the encoding circuit 28 informs the system controller of the cancellation of the buffer underrun. The system controller 10, receiving the information, controls the individual sections to resume the recording operation in such a manner that the data recorded before the occurrence of the buffer underrun is continuous with the data recorded after the cancellation of the buffer underrun. This realizes additional recording.

Figure 3:
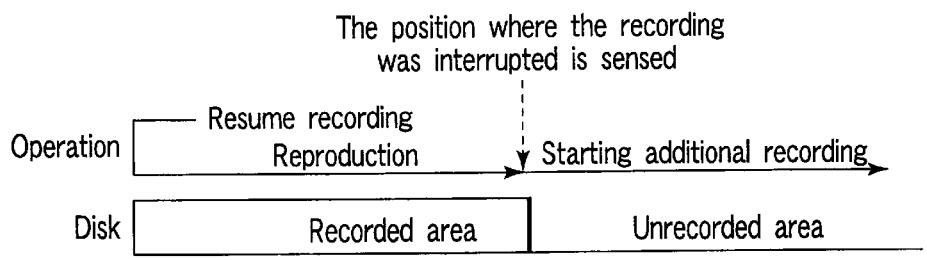
FIG. 3 is a diagram to help explain the resumption of the recording operation.

Referring to FIG. 3, the resumption of the recording operation will be explained. During the time from when the recording operation is interrupted until it is resumed, the optical pickup 14 is caused to stay on the track in the radial position where the recording interrupt position exists. As a result of the resumption of the recording operation, the optical pickup 14 is jumped from the track in the radial position where the recording interrupt position exists to a track (recorded area) closer to the inner edge. After the track jumping is completed, a reproducing operation is started. When the recording interrupt position is detected as a result of the reproduction, the operation is changed to the recording operation at the recording interrupt position, thereby starting additional recording from the recording interrupt position. That is, when the recording operation is interrupted after the data has been recorded in a predetermined position on the optical disk, the data recorded in the predetermined position is reproduced and the end of the predetermined position is detected. Then, the data is recorded again from an unrecorded area following the end.

The point is that the recording power is adjusted on the basis of the reproduced signal obtained until the recording interrupt position (end) has been detected. That is, the recording power is adjusted on the basis of the reproduced signal obtained from the reproduction before the additional recording is executed. The calibration of the recording power using the reproduction in detecting the recording interrupt position is called secondary power calibration.

Here, the secondary power calibration will be explained. The RF signal analysis circuit 26 detects the symmetry of the reproduced signal. That is, as shown in FIG. 2, the RF signal analysis circuit 26 detects not only the average amplitude value of the reproduced signal but also the intermediate value between the peak level and bottom level of the reproduced signal. Then, the comparison correction circuit 24 compares the average amplitude value with the intermediate value and, on the basis of the result of the comparison, supplies a correction signal to the laser light-emitting driver 20. If the average amplitude value is almost the same as the intermediate value, it is judged that the recording power is the best. That is, a signal to correct the recording power is not supplied. If the average amplitude value is smaller than the intermediate value, it is judged that the recording power is too high. That is, a correction signal to lower the recording power is supplied, thereby decreasing the recording power. Conversely, if the average amplitude value is larger than the intermediate value, it is judged that the recording power is too low. That is, a correction signal to raise the recording power is supplied, thereby increasing the recording power. Such a recording power calibration is executed during the reproduction carried out until the recording interrupt position is detected. As a result, in the additional recording resumed from the recording interrupt position, the data is recorded with the adjusted recording power.

Before the second power calibration, the data is recorded with the recording power adjusted in the initial power calibration. Once the recording power has been adjusted in the secondary power calibration, the recording power adjusted in the secondary power calibration becomes a standard. From this time on, the data is recorded with the standard recording power. Furthermore, when the recording operation is interrupted, the secondary power calibration is further executed. At this time, the recording power adjusted in the preceding second power calibration is further adjusted.

The system controller 10 may be provided with a recording power correction table, which is usable if necessary. In the recording power correction table, the correction data about the recording power prepared by the radial position on the optical disk is stored. When an optical disk on which the data has been partly recorded is installed in the optical disk unit and additional recording is done onto the optical disk, the result of the initial power calibration and the correction data stored in the recording power correction table are used. When additional recording is performed on the partly recorded optical disk, it is expected that the data will be recorded in a radial position away from the radial position where the adjusted area is located. That is, the recording power adjusted in the initial power calibration might not be used as it is. Thus, when an attempt is made to start to write the data with the recording power adjusted in the initial power calibration and adjust the recording power gradually in the secondary power calibration, it might take more time than expected. To prevent this, the recording power adjusted in the initial power calibration is corrected using the correction data stored in the recording power correction table, instead of using directly the recording power adjusted in the initial calibration. This enables the recording power to be adjusted to the best one in a short time.

As described above, the best recording power can be obtained efficiently by not only using the secondary power calibration in addition to the initial power calibration but also using the correction data table and secondary power calibration in addition to the initial power calibration. As a result, the data can be recorded suitably on the entire surface of the optical disk.

Figure 4:
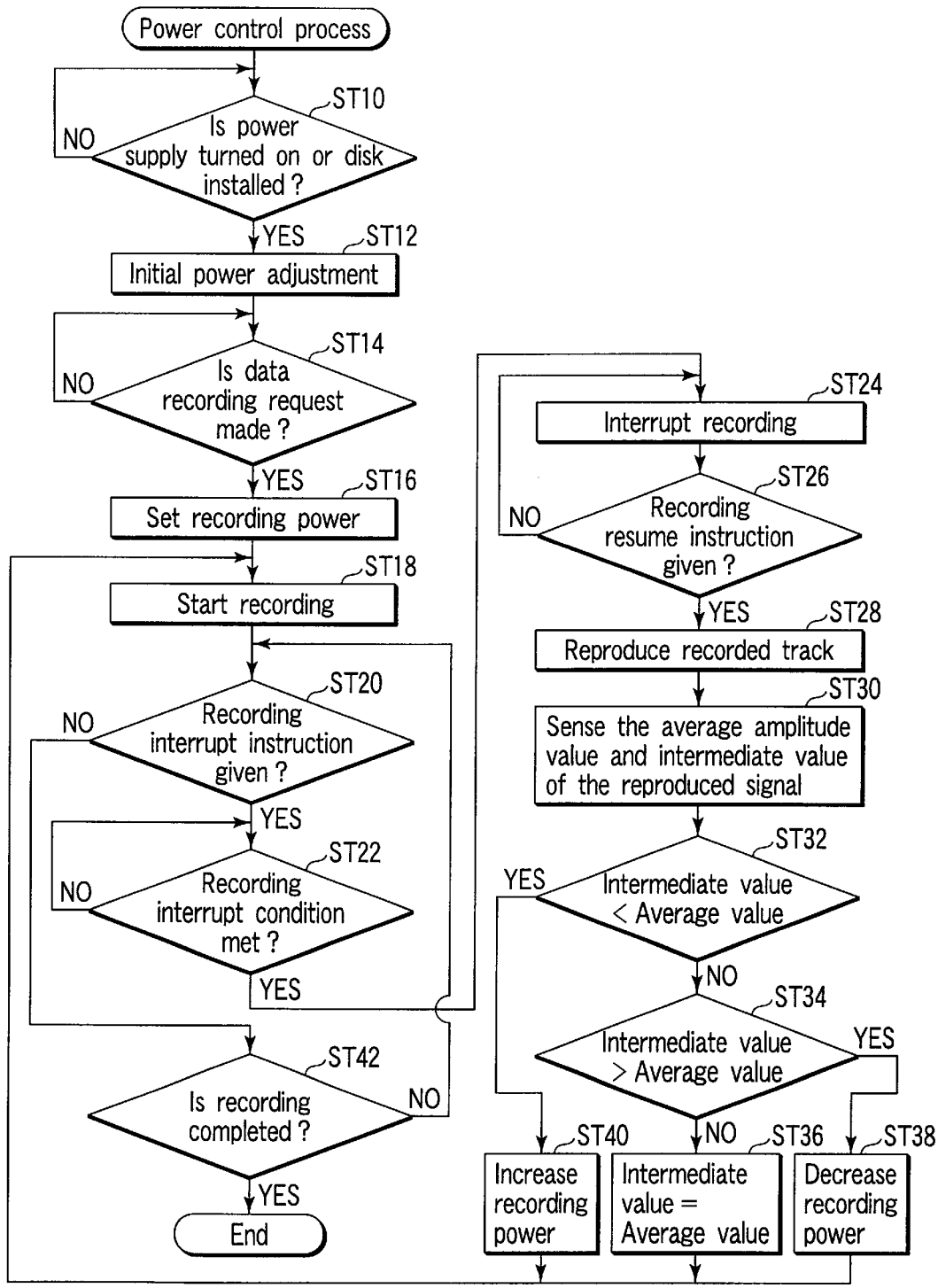
FIG. 4 is a flowchart to help explain recording power control.

Hereinafter, recording power control according to the present invention will be described by reference to a flowchart in FIG. 4.

When the power supply of the optical disk unit in which an optical disk has been installed is turned on (YES at step ST10), or when an optical disk is installed in the optical disk unit whose power supply is on (YES at ST10), the system controller 10 starts the initial power calibration (S12). The detailed explanation of the initial power calibration has been given above.

When the system controller 10 has received the data recording request (YES at ST14), the laser output setting circuit 22 sets the recording power adjusted in the initial power calibration (ST16). More specifically, the recording power adjusted in the initial power calibration is corrected and set on the basis of the correction data in the recording power correction table the system controller 10 has. This enables the data to be recorded with the recording power suitable for the radial position in which recording is to be performed.

After the recording power is set (ST16), recording is started (ST18). When an instruction to interrupt the recording operation has been recognized during the recording (YES at ST20) and the condition for the interruption of recording has been met (YES at ST22), the system controller 10 interrupts the recording operation (ST24). Thereafter, when an instruction to resume the recording operation has been recognized (YES at ST26), the system controller 10 causes track jumping to be performed to reproduce the recorded track to resume the recording operation (ST28). At this time, the recording power is adjusted on the basis of the reproduced signal obtained until the recording interrupt position (end) has been detected. Specifically, the RF signal analysis circuit 26 detects not only the average amplitude value of the reproduced signal but also the intermediate value between the peak level and bottom level of the reproduced signal (ST30). Then, the comparison correction circuit 24 compares the average amplitude value with the intermediate value and, on the basis of the result of the comparison, supplies the correction signal to the laser light-emitting driver 20. If the average amplitude value is almost the same as the intermediate value (NO at ST32) (NO at ST34) (ST36), it is judged that the recording power is the best. That is, a signal to correct the recording power is not supplied. If the average amplitude value is smaller than the intermediate value (NO at ST32) (YES at ST34), it is judged that the recording power is too high. That is, a correction signal to lower the recording power is supplied, thereby decreasing the recording power (ST38). Conversely, if the average amplitude value is larger than the intermediate value (YES at ST32), it is judged that the recording power is too low. That is, a correction signal to raise the recording power is supplied, thereby increasing the recording power (ST40). Such a recording power calibration is made during the reproduction carried out until the recording interrupt position has been detected. Therefore, when additional recording is started from the recording interrupt position, the data is recorded with the adjusted recording power (ST16). Thereafter, when there is no recording interrupt instruction (NO at ST20) and the recording is completed (YES at ST42), the recording operation is ended. When the data is recorded on the innermost track of the optical disk after the data has been recorded on the outer-edge track of the optical disk, the recording power adjusted in the initial power calibration is set.

The above explanation has dealt with the case where a buffer underrun occurred as a result of a shortage of the recording data and the buffer underrun is canceled by overcoming the shortage of the recording data. This invention is not limited to this. For instance, the system controller 10 may generate a buffer underrun and a buffer underrun cancel with predetermined timing, regardless of the capacity of the recording data. This enables additional recording to be done with predetermined timing, with the result that the recording power is controlled with predetermined timing. The predetermined timing will be explained more concretely.

When additional recording was done and no buffer underrun occurred for a predetermined period of time since the recording power was controlled as a result of the additional recording, the system controller may generate a buffer underrun and a buffer underrun cancel intentionally, which enables the recording power to be controlled periodically. Alternatively, the system controller may generate a buffer underrun and a buffer underrun cancel intentionally when a buffer underrun has not occurred for a predetermined period of time, regardless of whether additional recording is done and whether the recording power control is performed as a result of the execution of the additional recording. This enables the recording power to be controlled periodically.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data recording irradiation power control method comprising the steps of:

recording first data on a disk with a light beam of a predetermined recording power;

playing back the disk to detect an end of said first data;

recording second data from the position following the end detected by said playing back step; and controlling the recording power of a light beam for recording said second data on the reproduced signal obtained at the time of reproducing said first data.

2. A data recording irradiation power control method comprising the steps of:

recording first data on a disk with a light beam of a predetermined recording power;

playing back the disk to detect an end of said first data;

determining a recording power for recording said second data on the reproduced signal obtained at the time of reproducing said first data; and recording said second data from the position following the end with a light beam of the determined recording power.

3. A data recording irradiation power control method comprising the steps of:

irradiating a disk a light beam of recording power outputted corresponding to recording data and thereby recording the recording data onto the disk;

irradiating a light beam of reproducing power at a predetermined position on the disk after the data has been recorded in the predetermined position on the disk in said recording step, detecting the reflected light from the predetermined position, reproducing the recording data reflected in the reflected light, and not only detecting the end of the predetermined position but also additional recording the data again from an unrecorded area following the end; and controlling the recording power when the recording data is recorded in said recording step on the result of the reproduction in additional recording in said additional recording step.

4. The data recording irradiation power control method according to claim 3, further comprising the step of:

irradiating the light beam onto a calibration area on the disk according to a test pattern to record the test pattern in the calibration area, irradiating the light beam of reproducing power onto the calibration area, detecting the reflected light from the calibration area, and;

determining said recording power on the result of the reproduction of the recording data reflected in the reflected light.

5. The data recording irradiation power control method according to claim 3, further comprising the step of:

when the recording data is recorded in a predetermined position on the disk in said recording step, referring to correction data for the recording power of the light beam and correcting said recording power on the correction data corresponding to the radial position of the predetermined position.

6. The data recording irradiation power control method according to claim 3, further comprising the steps of:

interrupting the recording operation in said recording step when receiving an instruction to interrupt the recording operation during data recording in said recording step; and resuming the recording operation in additional recording in said additional recording step when receiving an instruction to resume the recording operation during the interruption of the recording operation in said recording interrupt control step.

7. The data recording irradiation power control method according to claim 3, further comprising the steps of:

monitoring the capacity of the recording data held in a buffer;

generating a buffer underrun when it has been detected in said monitoring step that the capacity of the recording data held in said buffer has dropped below a predetermined capacity;

interrupting the recording operation in said recording step according to the generation of said buffer underrun;

generating a buffer underrun cancel when it has been detected in said monitoring step that the capacity of the recording data held in said buffer has been restored to the predetermined capacity or above during the interruption of the recording operation in said recording interrupt control step; and resuming the recording operation in additional recording in said additional recording step according to the generation of said buffer underrun cancel in such a manner that the data recorded before the generation of said buffer underrun is continues with the data recorded after the cancellation of said buffer underrun.

8. The data recording irradiation power control method according to claim 7, further comprising the step of:

generating said buffer underrun and said buffer underrun cancel with predetermined timing.

9. The data recording irradiation power control method according to claim 7, further comprising the steps of:

generating said buffer underrun and said buffer underrun cancel intentionally when additional recording has been done in said additional recording step and said buffer underrun has not been generated for a predetermined period of time since the recording power was controlled in said power control step as a result of the additional recording.

10. The data recording irradiation power control method according to claim 7, further comprising the step of:

generating said buffer underrun and said buffer underrun cancel intentionally when said buffer underrun has not been generated for a predetermined period of time, while the recording data is being recorded in said recording step.

11. A disk drive comprising:

recording means for recording first data on a disk with a light beam of a predetermined recording power;

playback means for playing back the disk;

detecting means for detecting an end of said first data reproduced by playback means; and recording power control means for controlling the recording power of a light beam for recording said second data from the position following the end on the reproduced signal obtained at the time of reproducing said first data.

12. A disk drive comprising:

recording means for recording first data on a disk with a light beam of a predetermined recording power;

playback means for playing back the disk; and additional recording means for recording said first data with said recording means, then playing back the disk with said playback means to detect an end of said first data, and thereafter, determining a recording power for recording said second data on the reproduced signal obtained at the time of reproducing said first data, and then recording said second data form the position following the end with a light beam of the determined recording power.

13. A disk drive comprising:

recording means for irradiating onto a disk a light beam of recording power outputted corresponding to recording data and thereby recording the recording data onto the disk;

reproducing means for irradiating onto the disk a light beam of reproducing power, detecting the reflected light of the light beam, and reproducing the recording data reflected in the reflected light;

additional recording means for causing said recording means to record the data in a predetermined position on the disk, then causing said reproducing means to reproduce the data recorded in the predetermined position, and thereafter not only detecting the end of the predetermined position but also causing said recording means to record the data again from an unrecorded area following the end; and power control means for controlling the recording power when said recording means records the recording data on the result of the reproduction in additional recording by said additional recording means.

14. The disk drive according to claim 13, further comprising:

recording power determining means for irradiating the light beam onto a calibration area on the disk according to a test pattern to record the test pattern in the calibration area, further irradiating the light beam of reproducing power onto the calibration area, detecting the reflected light from the calibration area, and determining said recording power on the result of the reproduction of the recording data reflected in the reflected light.

15. The disk drive according to claim 13, further comprising:

storage means for storing light-beam recording-power correction data prepared according to the radial position on the disk; and correction means for reading from said storage means the correction data corresponding to the radial position of the predetermined position and correcting said recording power on the read correction data when said recording means records the recording data in the predetermined position on the disk.

16. The disk drive according to claim 13, further comprising:

recording interrupt control means for interrupting the recording operation by said recording means when receiving an instruction to interrupt the recording operation during data recording by said recording means; and recording resume control means for resuming the recording operation in additional recording by said additional recording means when receiving an instruction to resume the recording operation during the interruption of the recording operation by said recording interrupt control means.

17. The disk drive according to claim 13, further comprising:

a buffer for holding the recording data;

monitoring means for monitoring the capacity of the recording data held in said buffer;

buffer underrun generating means for generating a buffer underrun when said monitoring means has detected that the capacity of the recording data held in said buffer has dropped below a predetermined capacity;

recording interrupt control means for interrupting the recording operation by said recording means according to the generation of said buffer underrun;

buffer underrun cancel generating means for generating a buffer underrun cancel when said monitoring means has detected that the capacity of the recording data held in said buffer has been restored to the predetermined capacity or above during the interruption of the recording operation by said recording interrupt control means; and recording resume control means for resuming the recording operation in additional recording by said additional recording means according to the generation of said buffer underrun cancel in such a manner that the data recorded before the generation of said buffer underrun is continues with the recording data after the cancellation of said buffer underrun.

18. The disk drive according to claim 17, further comprising:

buffer underrun control means for generating said buffer underrun and said buffer underrun cancel with predetermined timing.

19. The disk drive according to claim 17, further comprising:

buffer underrun control means for generating said buffer underrun and said buffer underrun cancel intentionally when additional recording has been done by said additional recording means and said buffer underrun has not been generated for a predetermined period of time since the recording power was controlled as a result of the additional recording.

20. The disk drive according to claim 17, further comprising:

buffer underrun control means for generating said buffer underrun and said buffer underrun cancel intentionally when said buffer underrun has not been generated for a predetermined period of time, while said recording means is recording the recording data.

* * * * *